(12) United States Patent
Gameiro et al.

(10) Patent No.: US 9,022,056 B2
(45) Date of Patent: May 5, 2015

(54) DEVICE FOR FUEL RETURN VALVE

(71) Applicants: Sébastien Gameiro, Moissy-Cramayel Cedex (FR); Philippe Vertenoeuil, Moissy-Cramayel Cedex (FR)

(72) Inventors: Sébastien Gameiro, Moissy-Cramayel Cedex (FR); Philippe Vertenoeuil, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 185 days.

(21) Appl. No.: 13/750,034

(22) Filed: Jan. 25, 2013

(65) Prior Publication Data
US 2013/0192692 A1 Aug. 1, 2013

(30) Foreign Application Priority Data
Jan. 27, 2012 (FR) ...................................... 12 50784

(51) Int. Cl.
| | |
|---|---|
| *G05D 11/00* | (2006.01) |
| *F17D 3/00* | (2006.01) |
| *F02C 7/232* | (2006.01) |
| *F02C 9/38* | (2006.01) |

(52) U.S. Cl.
CPC .......... *F17D 3/00* (2013.01); *F05D 2270/3015* (2013.01); *F02C 7/232* (2013.01); *F02C 9/38* (2013.01)

(58) Field of Classification Search
USPC ........ 137/87.01, 87.04, 100, 111, 505.14, 99, 137/605; 60/734
See application file for complete search history.

(56) References Cited

U.S. PATENT DOCUMENTS 3,433,016 A 3/1969 Borel

FOREIGN PATENT DOCUMENTS

GB 654 256 6/1951

OTHER PUBLICATIONS

French Office Action dated Oct. 24, 2012 for Appln. No. 1250784.

*Primary Examiner* — Craig Schneider
*Assistant Examiner* — R. K. Arundale
(74) *Attorney, Agent, or Firm* — Pillsbury Winthrop Shaw Pittman LLP

(57) ABSTRACT

A device includes a first hot fuel bleed, a second cold fuel bleed, a fuel pressure regulator including a fuel inlet line, a fuel outlet line and a fuel pressure set point line, the pressure of the outlet line being set by the regulator to a fixed divergence from the pressure of the set point line, a first connector to connect the first bleed to the inlet line of the regulator and the second bleed to the set point line of the regulator, when a first pressure of the first bleed is greater than or equal to a second pressure of the second bleed and to connect the first bleed to the set point line of the regulator and the second bleed to the inlet line of the regulator when the first pressure is lower than the second pressure, and a second connector.

11 Claims, 1 Drawing Sheet

DEVICE FOR FUEL RETURN VALVE

CROSS REFERENCE TO RELATED APPLICATIONS

This application claims priority to French Patent Application No. 1250784, filed Jan. 27, 2012, the content of which is incorporated herein by reference in its entirety.

FIELD

The invention relates to the field of fuel return valves present in the thermoregulatory systems of fuel systems in aircraft or aeroplane engines,

BACKGROUND

A fuel return valve (FRV) is intended to return a certain quantity of hot, excess fuel which has passed through a hot section of a system constituted by an aeroplane engine and its fuel system to a fuel tank of an aeroplane in order to facilitate thermal management of the system.

If carried out at too high a temperature, returning hot fuel to the tank can cause problems with boiling or evaporation of the fuel. Despite such problems, FRVs are valued for their efficiency and low bulk.

In order to overcome the problems above, FRVs have been designed to meter out or deliver a fuel mixture from a hot fuel bleed obtained from the high pressure portion of the system and from cold fuel bled from upstream of the heat sources in the system in a mixing ratio or ratio of the flow rates of the cold fuel and the hot fuel composing the mixture leaving the FRV and returning to the tank of the aeroplane.

Ideally, the mixing ratio of a FRV is constant in order to control the temperature of that mixture irrespective of the pressure of the hot fuel and of the cold fuel at the inlet of a FRV.

Thus, in the prior art, FRVs are known which deliver a constant flow at their outlet and return it to the tank by means of two fixed restrictions. A first fixed restriction is in series with the hot bleed or hot restriction and a second fixed restriction is in series with the cold bleed or cold restriction, the first restriction and the second restriction being connected in parallel over a mixing point connected via a circuit for returning the reduced temperature fuel mixture to the tank.

The pressure in the tank being essentially constant, the pressure at the mixing point is also constant apart from the pressure drop between the mixing point and the tank. This means that the hot restriction of a FRV operates between the pressure of the hot bleed and the constant pressure of the tank, the difference between these two pressures being termed the hot pressure drop. This also means that the cold restriction of a FRV operates between the pressure of the cold bleed and the constant pressure of the tank, the difference between these two pressures being termed the cold pressure drop.

A constant pressure drop in any restriction, being connected to a constant flow rate in said any restriction, means that for a FRV, when the pressure of the hot bleed or hot pressure is constant, the flow delivered by the hot restriction is constant, and when the pressure of the cold bleed, or cold pressure, is constant, the flow delivered by the cold restriction is constant.

Thus, for a constant hot pressure and a constant cold pressure, the mixing rate of the FRV is constant, since it is the sum of two constant quantities, and its mixing ratio is constant since it is the ratio of two constant quantities.

When the hot pressure varies, the cold pressure remaining stable, the mixing ratio varies and the FRV becomes less accurate and less effective in moderating the return of the fuel mixture to the tank. However, in the prior art, a change in hot pressure is generally linked to that of the cold pressure. As a consequence, if the hot pressure varies, the prior art teaches inserting, in series between the hot bleed and the upstream inlet of the hot restriction of the FRV, a hot pressure regulator which can be used to regain the ideal operating conditions of the FRV under consideration with a constant pressure downstream of the hot pressure regulator. Since the pressure regulator is referenced to the cold pressure, the prior art FRV provided with a hot pressure regulator operates correctly when the difference between the hot pressure and the cold pressure can be kept constant. Such a fuel return valve provided with a pressure regulator at its upstream hot restriction inlet is termed a regulated FRV.

However, prior art pressure regulators, and thus FRVs provided with such a regulator, have limited efficiency when the hot pressure is stable and when the cold pressure, normally (in the case of architectures with a pressure recovery system between the hot bleed and the cold bleed, which are those being studied in this case. In architectures without a pressure recovery system, the cold pressure is ALWAYS higher than the hot pressure) less than the hot pressure, becomes greater than this hot pressure as well as variable.

In modern aeroplane engines, however, there are phases of a flight during which (inactive pressure recovery element) the difference between the hot pressure and the cold pressure, which is normally positive, becomes negative (presence of a pressure drop between the hot bleed and the cold bleed) and for which a FRV provided with a cold pressure that has become variable is still wanted.

Adding a second pressure regulator in series between the cold bleed and the upstream inlet of the cold restriction of a FRV cannot, however, be envisaged, since the pressure regulators cause leaks of fuel for the purposes of pressure regulation. In order to optimize the system, and in particular the dimensions of the fuel pump, it is standard practice to limit these leaks as much as possible. The presence of a cold line regulator and a hot line regulator thus appears in the prior art to limit the efficiency and simplicity of FRVs when considering and evaluating them as regards thermal management of the system which is germane to the invention.

For modern engines, then, integral management by oil/fuel or air/fuel heat exchangers is thus preferred. Thus, in the prior art, it is considered that FRVs cannot be used in modern engines, in particular because they are incapable of managing hot and cold pressure inversion phases when the hot pressure becomes lower than the cold pressure and when the cold pressure is stable, the hot pressure being highly variable (in a conventional flight, the cold pressure is stable while the hot pressure depends on the pressure recovery operation, which renders it unstable depending on whether or not it is used).

Despite high efficiency in certain phases of a flight and low bulk, the general use of regulated FRVs is thus considered in the prior art to be limited and they are not used for engines which are contemporary with that of the invention.

SUMMARY

In this context, an aspect of the invention is directed to a device comprising:
- a first, hot fuel bleed;
- a second, cold fuel bleed;
- a fuel pressure regulator, the regulator comprising a fuel inlet line, a fuel outlet line and a fuel pressure set point line, the pressure of the outlet line being set by the regulator to a fixed divergence from the pressure of the set point line;

a first connector configured to connect the first bleed to the inlet line of the regulator and the second bleed to the set point line of the regulator, when a first pressure of the first bleed is greater than or equal to a second pressure of the second bleed; and to connect the first bleed to the set point line of the regulator and the second bleed to the inlet line of the regulator when the first pressure is lower than the second pressure;

a second connector configured to connect:
an inlet of a first restriction to the outlet line of the regulator;
an inlet of a second restriction to the set point line of the regulator;
an outlet from the first restriction with an outlet from the second restriction when the first pressure is greater than or equal to the second pressure;
an inlet of a third restriction, delivering the same flow as the second restriction under identical conditions, to the regulator outlet line;
an inlet of a fourth restriction, delivering the same flow as the first restriction under identical conditions, to the regulator set point line;
an outlet from the third restriction with an outlet from the fourth restriction when the first pressure is lower than the second pressure.

In an embodiment of the invention:
the first connector comprises a first fuel distribution slide valve comprising: a first line connected to the first bleed, a second line connected to the second bleed, a third line connected to the regulator inlet line, a fourth line connected to the set point line of the regulator, a fifth line connected to the first bleed, and a sixth line connected to the second bleed;

the first slide valve comprising:
a first service position and a second service position, the first slide valve occupying the first position when the pressure difference between the fifth and the sixth line is positive or zero and the first slide valve occupying the second position when the pressure difference between the fifth and the sixth line is negative;
a first open passage between the first line and the third line and a second open passage between the second line and the fourth line when the first slide valve occupies the first service position;
a third open passage between the first line and the fourth line and a fourth open passage between the second line and the third line when the first slide valve occupies the second service position;

In an embodiment, the second connector comprises a second fuel distribution slide valve comprising a seventh line connected to the outlet line of the regulator, an eighth line connected to the set point line of the regulator, a ninth line, a tenth line connected to the ninth line, an eleventh line connected to the first bleed and a twelfth line connected to the second bleed;

the second valve comprising:
a third service position and a fourth service position, the second slide valve occupying the third position when the pressure difference between the eleventh and the twelfth line is positive or zero and the second slide valve occupying the fourth position when the pressure difference between the eleventh and the twelfth line is negative;
the first restriction between the seventh line and the ninth line and the second restriction between the eighth line and the tenth line when the second slide valve occupies the third service position;

the third position between the seventh line and the ninth line and the fourth restriction between the eighth line and the tenth line when the second slide valve occupies the fourth service position;
a fifth open passage connected in parallel to the ninth line and to the tenth line, resulting in mixing of the fuel obtained from said ninth line and from said tenth line.

In an embodiment, the third restriction is the second restriction, the fourth restriction is the first restriction, the second connector comprises a sixth open mixing passage for connecting the outlet from the first restriction to the outlet from the second restriction, the second connector comprises a third fuel distribution slide valve, comprising a thirteenth line connected to the outlet line of the regulator, a fourteenth line connected to the set point line of the regulator, a fifteenth line connected to the inlet to the first restriction, a sixteenth line connected to the inlet to the second restriction, a seventeenth line connected to the first bleed and an eighteenth line connected to the second bleed, the third slide valve comprising:
a fifth service position and a sixth service position, the third slide valve occupying the fifth position when the pressure difference between the seventeenth line and the eighteenth line is positive or zero and the third slide valve occupying the sixth position when the pressure difference between the seventeenth line and the eighteenth line is negative;
a seventh open passage between the seventh line and the ninth line and an eighth open passage between the eighth line and the tenth line when the third slide valve occupies the fifth service position;
a ninth open passage between the seventh line and the tenth line and a tenth open passage between the eighth line and the ninth line when the third slide valve occupies the sixth service position;

In an embodiment, the fuel is an aeroplane fuel,
In an embodiment, the first restriction, the second restriction, the third restriction and the fourth restriction are diaphragms.

An aspect of the invention also concerns a method of obtaining a device as defined hereinabove, comprising:
connecting the first bleed to the inlet line of the regulator and the second bleed to the set point line of the regulator, connecting the inlet of the first restriction to the outlet line of the regulator, connecting the inlet of the second restriction to the set point line of the regulator and connecting the outlet from the first restriction to the outlet of the second restriction when the first pressure is greater than or equal to the second pressure;
connecting the first bleed to the set point line of the regulator and the second bleed to the inlet line of the regulator, connecting the inlet of the third restriction to the outlet line of the regulator, connecting the inlet of the fourth restriction to the set point line of the regulator and connecting the outlet from the third restriction to the outlet of the fourth restriction when the first pressure is lower than the second pressure.

Another aspect of the invention also concerns a method of using a device in accordance with the invention in an aircraft engine by replacing a fuel return valve of the engine.

It will be appreciated that the invention also applies in the opposite case where the system is designed for a cold pressure which is normally higher than the hot pressure and where certain cases correspond to a cold pressure which is lower than the hot pressure. It all depends on where the reference for the starting architecture is fixed ($P_{hot} > P_{cold}$ or $P_{hot} < P_{cold}$).

The invention will be better understood from the following description made with reference to the figures a list of which is given below.

DETAILED DESCRIPTION

Figure 1:
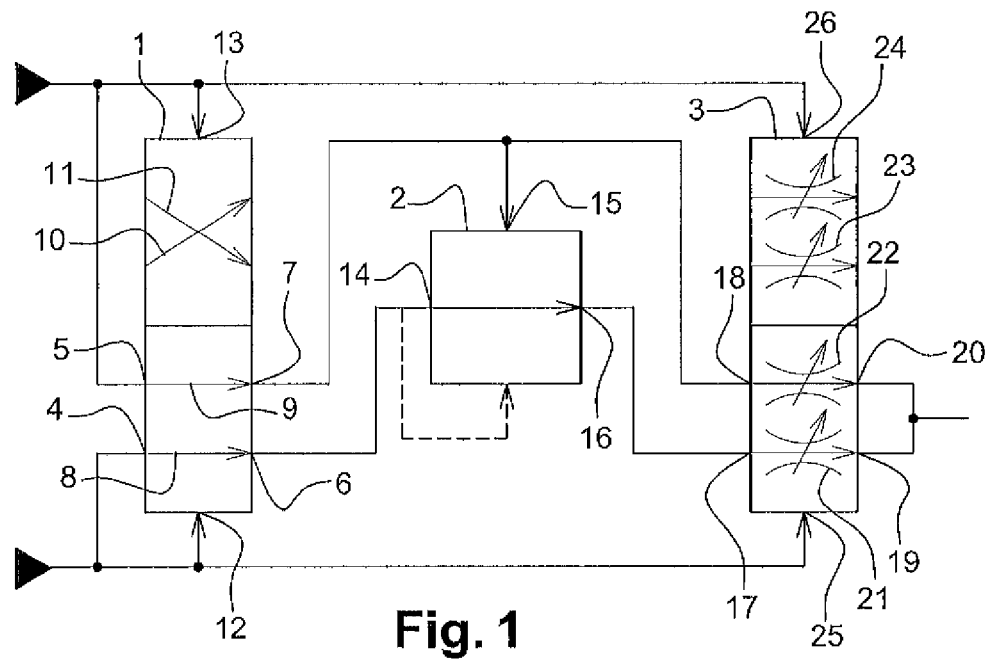
FIG. 1 represents a first embodiment incorporating a FRV in accordance with the invention.

Referring to FIG. 1, in a first embodiment of the invention, the figure shows a first connector or coupler including a first slide valve 1 which has four lines and two service positions, a pressure regulator 2 and a second connector or coupler including a second slide valve 3 with four lines and two service positions.

In this first embodiment, the first slide valve comprises a first line 4, a second line 5, a third line 6 and a fourth line 7. The first line and the third line are connected via a first open passage 8 and the second line and the fourth line are connected via a second open passage 9 in the first service position. In contrast, in the second service position, the first line 4 and the fourth line 7 are connected via a third open passage 10 and the second line and the third line are connected via a fourth open passage 11. In addition, a first control inlet 12 of the first slide valve is connected to a hot fuel bleed in a fuel system of an aeroplane engine and a second control input 13 of the first slide valve is connected to a cold fuel bleed in the fuel system of an aeroplane engine. The slide valve is set so that a first pressure on the first input of the first slide valve which is greater than or equal to the second pressure on the second input of the first slide valve imposes the first service position on the first slide valve and so that if the first pressure falls below the second pressure, then the first slide valve switches to the second service position and the hot and cold bleeds are reversed on the third and fourth lines.

In this first embodiment, the invention comprises a pressure regulator 2 which comprises a regulator fuel inlet 14, a regulator fuel pressure input 15 and a regulator fuel outlet 16.

In this first embodiment, the second slide valve comprises a seventh line 17, an eighth line 18, a ninth line 19 and a tenth line 20. In a third service position of the second slide valve, a first restriction 21 is between the seventh line and the ninth line, a second restriction 22 is between the eighth line and the tenth line and in a fourth service position of the second slide valve, a third restriction 23 identical in flow delivered to the second restriction is disposed between the seventh line and the ninth line and a fourth restriction 24 identical in flow delivered to the first restriction is disposed between the eighth line and the tenth line. The second slide valve also comprises an eleventh line 25 connected to the first bleed and a twelfth line 26 connected to the second bleed. The second slide valve is in the third service position if the pressure difference between the eleventh and the twelfth line is positive or zero; if it is negative, the slide valve switches into the fourth service position.

In this first embodiment, the third line 6 of the first slide valve is connected to the inlet line 14 of the regulator, the fourth line 7 of the first slide valve is connected to the control inlet 15 of the regulator, the outlet 16 from the regulator is connected to the seventh line 17 of the second slide valve, the control inlet 15 of the regulator is connected to the eighth line 18 of the second slide valve and the ninth line 19 of the second slide valve is connected to the tenth line 20 of the second slide valve to allow mixing of a fluid leaving the second slide valve and its return to a tank.

In this first embodiment, the invention means that an existing fuel return valve can be replaced by the first embodiment of the invention.

Figure 2:
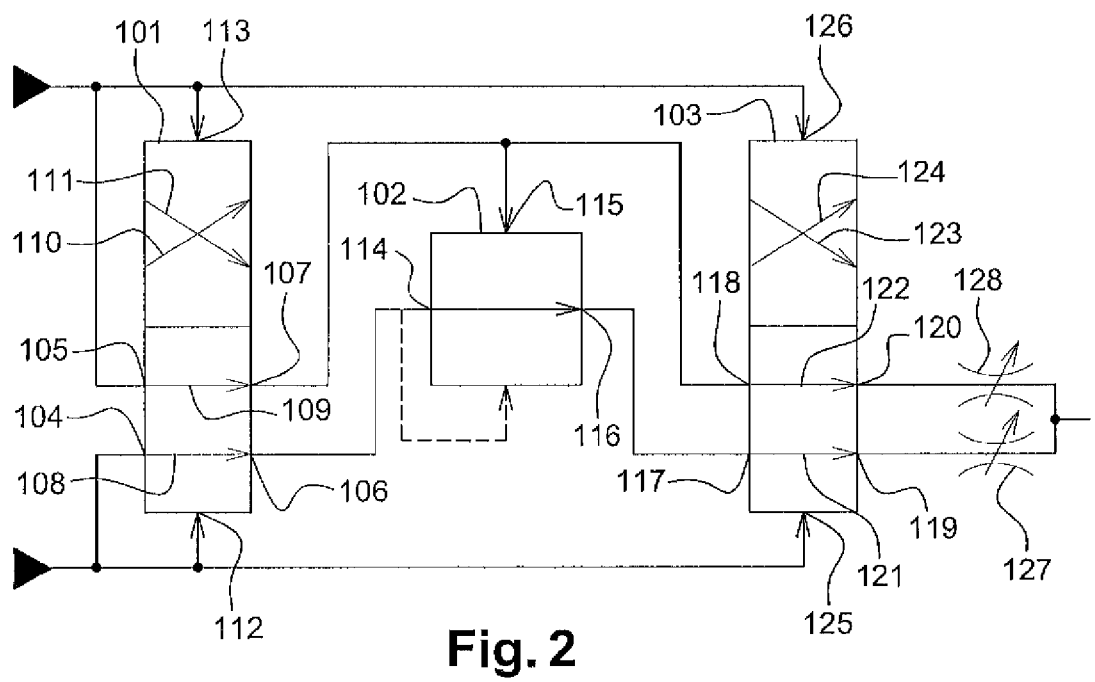
FIG. 2 represents a second embodiment that can be adapted to an existing FRV.

Referring now to FIG. 2, in a second embodiment of the invention. the figure shows a first connector or coupler comprising a first slide valve 101, a pressure regulator 102, a second connector or coupler including a second slide valve 103 identical to the first slide valve 101, a first restriction 127 and a second restriction 128.

The first slide valve 101 of this second embodiment comprises a first line 104, a second line 105, a third line 106, a fourth line 107, a first passage 108 between the first and the third line, a second passage 109 between the second line and the fourth line in a first service position of the first slide valve.

The first slide valve of this second embodiment comprises a third passage 110 between the first and the fourth line and a fourth passage 111 between the second and the third line for a second service position of the first slide valve.

The first slide valve of this second embodiment comprises a first pressure control input 112 of the first slide valve, connected to a first hot fuel bleed, and a second pressure control input 113 of the first slide valve connected to a second cold fuel bleed.

The first slide valve of this second embodiment is set to switch from the first service position to the second service position when a first pressure on its first control input drops below a second pressure on its second control input and to remain in its first service position if the first pressure is greater than or equal to the second pressure.

In this second embodiment, the invention comprises a pressure regulator 102, provided with a flow inlet 114 and a flow outlet the pressure of which is regulated with respect to a set point input 115. The regulator inlet is connected to the third line of the first slide valve; the regulator control is connected to the fourth line of the first slide valve.

The second slide valve 103 of this second embodiment has four lines, a fifth service position and a sixth service position. The second slide valve of this second embodiment thus comprises a seventh line 117, an eighth line 118, a ninth line 119 and a tenth line 120, an eleventh control line 125 and a twelfth control line 126. The seventh line 117 is connected to the outlet from the regulator 116, the eighth line to the set point input of the regulator 115, the ninth line is connected to an inlet to the first restriction 127 and the tenth line is connected to an inlet to the second restriction 128.

In this second embodiment, an outlet from the first restriction 127 is connected to an outlet from the second restriction 128 in order to carry out mixing of fuel originating from the cold bleed and of the hot bleed.

The second slide valve of this second embodiment also comprises a fifth open passage 121, a sixth open passage 122, a seventh open passage 123 and an eighth open passage 124.

The second slide valve is set so as to switch from a first service position where lines seven and nine of the second slide valve are connected via the fifth passage 121 and lines eight and ten are connected via the sixth open passage 122, to a second service position where lines seven and ten are connected via the eighth passage 124 and lines eight and nine are connected via the seventh passage 123. Switching of the second slide valve is set so as to be carried out by application of the same criteria as when switching the first slide valve in order to switch at the same time on the first and second slide valve.

Thus, the second slide valve will switch to the second position if the second pressure on the second input or twelfth line 126 becomes higher than the first pressure on the first input or eleventh line 125 and it will stay in the same service position if the first pressure remains higher than the second pressure.

The first and the second slide valve of this embodiment are controlled by the same signals and switch together, and so it is possible to regulate the pressure of the line, cold or hot, that needs it without deregulating the mixing ratio of the fuel return mixture, the cold fuel being redirected via the second slide valve towards the cold restriction; similarly, the hot fuel, which has become the reference of the regulator, is returned to the hot restriction by this same second slide valve in this second embodiment.

In this second embodiment, it is possible to recognize in the first and the second restriction an inlet for a non-regulated fuel return valve of the prior art. It is thus possible to install the invention on an existing prior art fuel return valve without replacing it, by installing in series, upstream of the existing valve, i.e. against the flow fuel from the valve in the fuel system, a block constituted by the first slide valve described in the second embodiment, the pressure regulator described in the second embodiment and the second slide valve described in the second embodiment, and by using the first and second restriction linked by a FRV to constitute the combined first and second restrictions of the second embodiment.

In this second embodiment, then, it is possible to install the invention by adding it to an existing valve without modifying the latter. However, this embodiment requires a supplemental component, namely the second slide valve, compared with the first embodiment of the invention which was described.

In an embodiment of the invention, the distributing slide valves or hydraulic slide valves can be used to reverse the operational mode of the FRV such that it always delivers the same cold or hot flows. This results in the possibility of positioning the first and second fuel bleeds in a fuel system of an aircraft engine without having to be concerned about the change in the pressures of the bleeds in operation.

With an embodiment of the invention, then, the complexity of fuel systems is not increased by rendering the regulating logic more complex in order to manage the thermal dynamics of an engine provided with the device of the invention; rather, the architecture of the hydraulics is proven and reliable.

Thus, embodiments of the invention can be extended to possibilities of using the qualities of fuel return valves in a large number of engine architectures by replacing an existing valve with one of the invention, in particular in accordance with the described first embodiment or by fitting out an existing fuel return valve with the second described embodiment of the invention.

The invention is capable of industrial application in the field of aircraft engines.

The invention claimed is:

1. A device for a fuel return valve, comprising:
   a first hot fuel bleed;
   a second cold fuel bleed;
   a fuel pressure regulator, the regulator comprising a fuel inlet line, a fuel outlet line and a fuel pressure set point line, the pressure of the outlet line being set by the regulator to a fixed divergence from the pressure of the set point line;
   a first connector configured to connect the first bleed to the inlet line of the regulator and the second bleed to the set point line of the regulator, when a first pressure of the first bleed is greater than or equal to a second pressure of the second bleed; the first connector further configured to connect the first bleed to the set point line of the regulator and the second bleed to the inlet line of the regulator when the first pressure is lower than the second pressure;
   a second connector configured to connect:
      an inlet of a first restriction to the outlet line of the regulator;
      an inlet of a second restriction to the set point line of the regulator;
      an outlet from the first restriction with an outlet from the second restriction when the first pressure is greater than or equal to the second pressure;
      an inlet of a third restriction, delivering the same flow as the second restriction under identical conditions, to the outlet line of the regulator;
      an inlet of a fourth restriction, delivering the same flow as the first restriction under identical conditions, to the set point line of the regulator;
      an outlet from the third restriction with an outlet from the fourth restriction when the first pressure is lower than the second pressure.

2. The device as claimed in claim 1, wherein the first connector comprises a first fuel distribution slide valve comprising a first line connected to the first bleed, a second line connected to the second bleed, a third line connected to the inlet line of the regulator, a fourth line connected to the set point line of the regulator, a fifth line connected to the first bleed and a sixth line connected to the second bleed;
   the first slide valve comprising:
      a first service position and a second service position, the first slide valve occupying the first position when the pressure difference between the fifth and the sixth line is positive or zero and the first slide valve occupying the second position when the pressure difference between the fifth and the sixth line is negative;
      a first open passage between the first line and the third line and a second open passage between the second line and the fourth line when the first slide valve occupies the first service position;
      a third open passage between the first line and the fourth line and a fourth open passage between the second line and the third line when the first slide valve occupies the second service position.

3. The device as claimed in claim 1, wherein the second connector comprises a second fuel distribution slide valve comprising a seventh line connected to the outlet line of the regulator, an eighth line connected to the set point line of the regulator, a ninth line, a tenth line connected to the ninth line, an eleventh line connected to the first bleed and a twelfth line connected to the second bleed;
   the second slide valve comprising:
      a third service position and a fourth service position, the second slide valve occupying the third position when the pressure difference between the eleventh and the twelfth line is positive or zero and the second slide valve occupying the fourth position when the pressure difference between the eleventh and the twelfth line is negative;
      said first restriction between the seventh line and the ninth line and said second restriction between the eighth line and the tenth line when the second slide valve occupies the third service position;
      said third restriction between the seventh line and the ninth line and said fourth restriction between the eighth line and the tenth line When the second slide valve occupies the fourth service position;

a fifth open passage connected in parallel to the ninth line and to the tenth line, resulting in mixing of the fuel obtained from said ninth line and from said tenth line.

4. The device as claimed in claim 1, wherein said third restriction is said second restriction, said fourth restriction is said first restriction, the second connector comprising a sixth open mixing passage configured to connect the outlet from the first restriction to the outlet from the second restriction, the second connector comprising a third fuel distribution slide valve, comprising a thirteenth line connected to the outlet line of the regulator, a fourteenth line connected to the set point line of the regulator, a fifteenth line connected to the inlet to the first restriction, a sixteenth line connected to the inlet to the second restriction, a seventeenth line connected to the first bleed and an eighteenth line connected to the second bleed, the third slide valve comprising:
a fifth service position and a sixth service position, the third slide valve occupying the fifth position when the pressure difference between the seventeenth line and the eighteenth line is positive or zero and the third slide valve occupying the sixth position when the pressure difference between the seventeenth line and the eighteenth line is negative;
a seventh open passage between the seventh line and the ninth line and an eighth open passage between the eighth line and the tenth line when the third slide valve occupies the fifth service position;
a ninth open passage between the seventh line and the tenth line and a tenth open passage between the eighth line and the ninth line when the third slide valve occupies the sixth service position.

5. The device as claimed in claim 1, wherein the fuel is an aircraft engine fuel.

6. The device as claimed in claim 1, wherein the first restriction, the second restriction, the third restriction and the fourth restriction are diaphragms.

7. A method for obtaining a device as claimed in claim 1, comprising:
connecting the first bleed to the inlet line of the regulator and the second bleed to the set point line of the regulator, connecting the inlet of the first restriction to the outlet line of the regulator, connecting the inlet of the second restriction to the set point line of the regulator and connecting the outlet from the first restriction to the outlet of the second restriction when the first pressure is greater than or equal to the second pressure;
connecting the first bleed to the set point line of the regulator and the second bleed to the inlet line of the regulator, connecting the inlet of the third restriction to the outlet line of the regulator, connecting the inlet of the fourth restriction to the set point line of the regulator and connecting the outlet from the third restriction to the outlet of the fourth restriction when the first pressure is lower than the second pressure.

8. A method comprising utilizing a device as claimed in claim 1 in an aircraft engine as a replacement of, or in addition to, an engine fuel return valve.

9. A device for a fuel return valve, comprising:
a first hot fuel bleed;
a second cold fuel bleed;
a fuel pressure regulator, the regulator comprising a fuel inlet line, a fuel outlet line and a fuel pressure set point line, the pressure of the outlet line being set by the regulator to a fixed divergence from the pressure of the set point line;
a first means for connecting the first bleed to the inlet line of the regulator and the second bleed to the set point line of the regulator, when a first pressure of the first bleed is greater than or equal to a second pressure of the second bleed; and for connecting the first bleed to the set point line of the regulator and the second bleed to the inlet line of the regulator when the first pressure is lower than the second pressure;
a second means for connecting:
an inlet of a first restriction to the outlet line of the regulator;
an inlet of a second restriction to the set point line of the regulator;
an outlet from the first restriction with an outlet from the second restriction when the first pressure is greater than or equal to the second pressure;
an inlet of a third restriction, delivering the same flow as the second restriction under identical conditions, to the outlet line of the regulator;
an inlet of a fourth restriction, delivering the same flow as the first restriction under identical conditions, to the set point line of the regulator;
an outlet from the third restriction with an outlet from the fourth restriction when the first pressure is lower than the second pressure.

10. The device as claimed in claim 9, wherein the first means comprises a first fuel distribution slide valve comprising a first line connected to the first bleed, a second line connected to the second bleed, a third line connected to the inlet line of the regulator, a fourth line connected to the set point line of the regulator, a fifth line connected to the first bleed and a sixth line connected to the second bleed;

the first slide valve comprising:
a first service position and a second service position, the first slide valve occupying the first position when the pressure difference between the fifth and the sixth line is positive or zero and the first slide valve occupying the second position when the pressure difference between the fifth and the sixth line is negative;
a first open passage between the first line and the third line and a second open passage between the second line and the fourth line when the first slide valve occupies the first service position;
a third open passage between the first line and the fourth line and a fourth open passage between the second line and the third line when the first slide valve occupies the second service position.

11. The device as claimed in claim 9, wherein the second means comprises a second fuel distribution slide valve comprising a seventh line connected to the outlet line of the regulator, an eighth line connected to the set point line of the regulator, a ninth line, a tenth line connected to the ninth line, an eleventh line connected to the first bleed and a twelfth line connected to the second bleed;

the second slide valve comprising:
a third service position and a fourth service position, the second slide valve occupying the third position when the pressure difference between the eleventh and the twelfth line is positive or zero and the second slide valve occupying the fourth position when the pressure difference between the eleventh and the twelfth line is negative;
said first restriction between the seventh line and the ninth line and said second restriction between the eighth line and the tenth line when the second slide valve occupies the third service position;

said third restriction between the seventh line and the ninth line and said fourth restriction between the eighth line and the tenth line when the second slide valve occupies the fourth service position;

a fifth open passage connected in parallel to the ninth line and to the tenth line, resulting in mixing of the fuel obtained from said ninth line and from said tenth line.

* * * * *